United States Patent
Dasar et al.

(10) Patent No.: US 9,715,423 B1
(45) Date of Patent: Jul. 25, 2017

(54) AUTOMATIC MAPPING OUT OF THE FAULTY DEVICE/DRIVERS DURING SYSTEM BOOT-UP

(71) Applicant: DELL PRODUCTS, L.P., Round Rock, TX (US)

(72) Inventors: Sundar Dasar, Round Rock, TX (US); Yogesh Prabhakar Kulkarni, Round Rock, TX (US); Mark W. Shutt, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 19 days.

(21) Appl. No.: 14/991,865

(22) Filed: Jan. 8, 2016

(51) Int. Cl.
*G06F 11/00* (2006.01)
*G06F 11/07* (2006.01)
*G06F 9/44* (2006.01)

(52) U.S. Cl.
CPC .......... *G06F 11/079* (2013.01); *G06F 9/4408* (2013.01); *G06F 11/0721* (2013.01)

(58) Field of Classification Search
USPC .......................................................... 714/37
See application file for complete search history.

(56) References Cited

U.S. PATENT DOCUMENTS

| | | | |
|---|---|---|---|
| 5,974,546 A | 10/1999 | Anderson | |
| 6,766,479 B2* | 7/2004 | Edwards, Jr. | G06F 11/221 710/105 |
| 2005/0028021 A1* | 2/2005 | English | H04L 1/22 714/1 |
| 2010/0083056 A1* | 4/2010 | Spier | G05B 23/0275 714/47.3 |
| 2012/0210165 A1 | 8/2012 | Lambert et al. | |
| 2015/0143176 A1* | 5/2015 | Xiang | G06F 11/079 714/37 |

* cited by examiner

*Primary Examiner* — Sarai Butler
(74) *Attorney, Agent, or Firm* — Isidore PLLC

(57) ABSTRACT

A method and an information handling system (IHS) perform server boot failure recovery by disabling failed devices and/or failed functions within functional devices. According to one aspect, a processor-executed fault isolation module (FIM) initiates calls to detected devices during a binding phase. The FIM identifies devices corresponding to successfully completed calls as operational devices, and identifies devices corresponding to failed calls as failed devices. Following completion of the binding phase, the FIM initiates calls, via a pre-boot application, to individual protocol functions of each operational device identified during the binding phase. If a first protocol call to a first operational device is successfully completed, the FIM identifies a protocol function(s) corresponding to the first protocol call as an operational function(s). If a second protocol call fails, the FIM identifies a corresponding protocol function(s) as a failed function(s) and isolates failed functions from operational functions for the first operational device.

20 Claims, 6 Drawing Sheets

FIG. 2

Very High Level Boot Flow

200 →

| Chipset/ Memory Initialization 202 | Dispatch DXE Drivers 204 | Initialize/ Enumerate PCI | Initialize/ Consoles | Connect all UEFI Drivers 206 | Enumerate Boot Options | Execute Pre-Boot Applications (CSIOR, SSM, USC) 208 | Boot to OS |

| Slot Number | Unique ID | Protocols failing GUID |
|---|---|---|
| 1 | xx-xxxx-xx-xx-xxx | Firmware Management |
| 6 | yy-yyyy-yy-yy-yyy | Hii Forms protocol |

302  304  306  308  310  312

AUTOMATIC MAPPING OUT OF THE FAULTY DEVICE/DRIVERS DURING SYSTEM BOOT-UP

BACKGROUND

1. Technical Field

The present disclosure generally relates to information handling systems and in particular to server boot failure recovery within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSs include a category of systems called converged shared infrastructure systems. A converged infrastructure operates by grouping multiple information technology (IT) components such as other IHSs into a single computing package. Components of a converged infrastructure may include servers, which can include host compute nodes, data storage devices, networking equipment and software for IT infrastructure management. Converged infrastructure provides centralized management of IT resources, system consolidation, increased resource-utilization rates, and lower operational costs.

Following the application of electrical power or a system reset, a server IHS implements a boot-up operation. Often referred to as the binding process, server boot-up involves the basic input/output system (BIOS) loading different vendor drivers and also mapping and managing the drivers and devices. To achieve system management on the supported vendor devices, the BIOS detects these devices and loads appropriate drivers required to facilitate system management functionality related to the respective device. During this process, customers may face one or both of the following issues: (i) there is no operational user control functionality on the device being plugged into the system once the devices leave the factory (or manufacturing facility); and (ii) the drivers may expose issues when certain use cases, such as configuration changes or firmware updates, are executed through a pre-boot application.

The system may enter a bad state (e.g., hang or crash) when there are issues with the drivers/devices. Some possible reasons for the crash situation could include the following: (1) an issue with a device UEFI driver; and (2) an issue with a pre-boot application accessing the driver. Recovery from these crash situations involves tedious trouble shooting, including identifying and/or understanding which device/driver is causing the system to go into the bad state.

Currently, the only work around for recovering from an issue seen during the binding process involves removing the cards one by one until the faulty adapter is located. If the issue happens during a pre-boot application execution phase, such as during inventory collection, job execution, or launching pre-boot, a user interface (UI) customer may have to adapt one of the following recovery methods: (i) remove cards one by one until the faulty device is located; (ii) disable the slot one by one until the faulty device is located; and (iii) disable pre-boot applications. The above mentioned recovery methods are tedious manual processes, which are not feasible solutions when these devices/drivers enter a bad state and are deployed in large data centers.

BRIEF SUMMARY

Disclosed are a method and an information handling system (IHS) that perform server boot failure recovery by autonomously disabling failed devices and/or failed functions within functional devices. According to one aspect, a fault isolation module (FIM) executes on a processor within the IHS and causes the processor to initiate calls to detected devices during a binding phase. The FIM identifies devices corresponding to successfully completed calls as operational devices, and the FIM identifies devices corresponding to failed calls as failed devices. Following completion of the binding phase, the FIM initiates calls, via a pre-boot application, to individual protocol functions of each operational device identified during the binding phase. If a first protocol call to a first operational device is successfully completed, the FIM identifies each protocol function corresponding to the first protocol call as an operational function. If a second protocol call fails, the FIM identifies each corresponding protocol function as a failed function(s) and isolates failed functions from operational functions for the first operational device.

According to one embodiment, the method includes initiating calls to detected electronic devices during a binding phase of a system boot. In response to a first call to a first detected device being successfully completed, the method includes identifying the first detected device as an operational device, and in response to a second call to a second detected device not being successfully completed, identifying the second detected device as a failed device. The method also includes initiating calls, via a pre-boot application, to individual protocol functions of each operational device identified during the binding phase, and in response to a first protocol call to a first operational device being successfully completed, identifying protocol functions corresponding to the first protocol call as operational functions. However, in response to a second protocol call to the first operational device not being successfully completed, the method includes identifying protocol functions corresponding to the second protocol call as failed functions and isolating the failed functions from the operational functions for the first operational device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates a high level server boot flow within an IHS, according to one or more embodiments;

FIG. 3 is a table providing information about an operational status of various functions provided by respective devices within an IHS, according to one embodiment;

DETAILED DESCRIPTION

Figure 1:
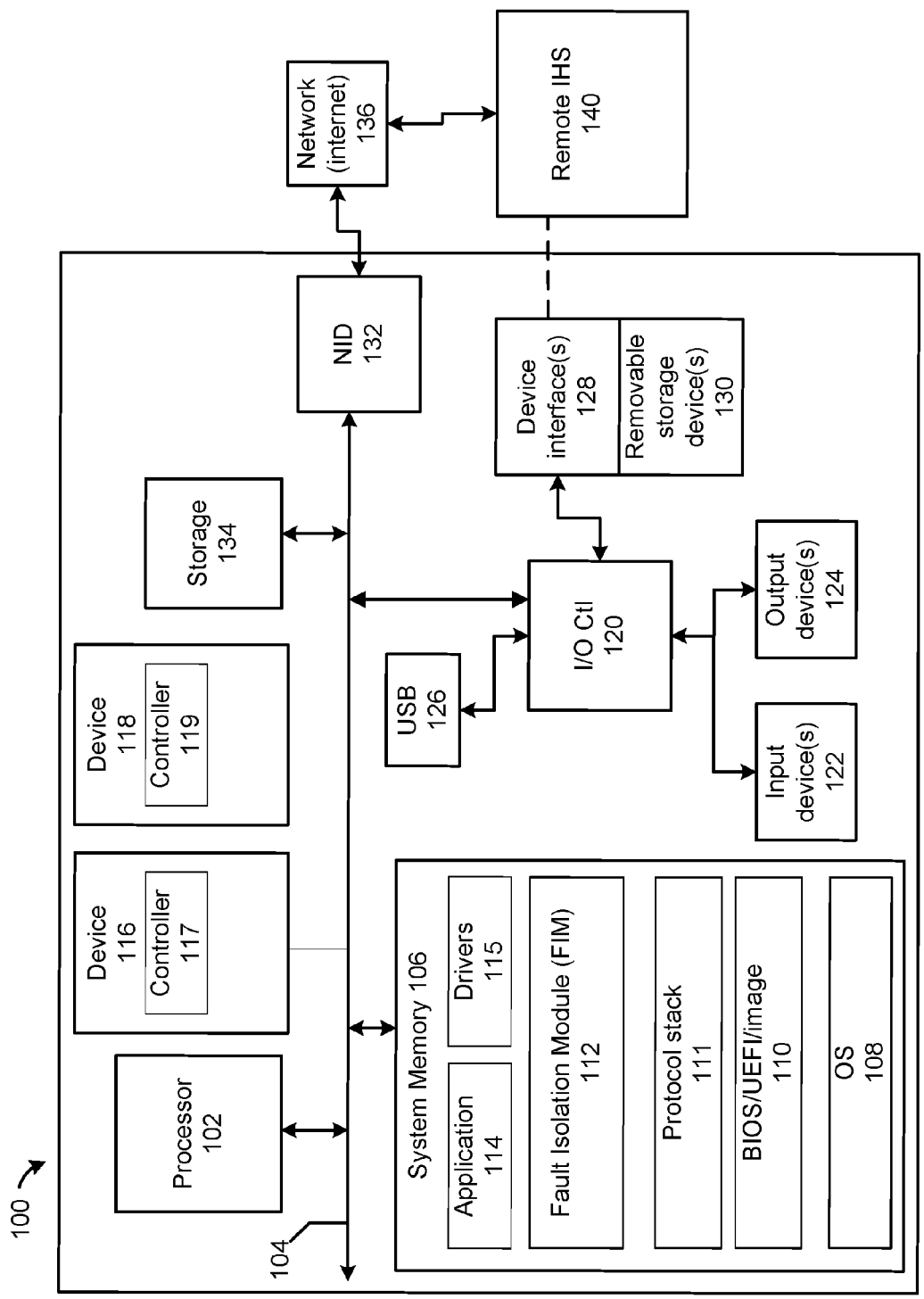
FIG. 1 illustrates an example information handling system (IHS) within which various aspects of the disclosure can be implemented, according to one or more embodiments.

The illustrative embodiments provide a method and an information handling system (IHS) that perform server boot failure recovery by disabling failed devices and/or failed functions within functional devices. According to one aspect, a fault isolation module (FIM) executes on a processor within the IHS and causes the processor to initiate calls to detected devices during a binding phase. The FIM identifies devices corresponding to successfully completed calls as operational devices, and the FIM identifies devices corresponding to failed calls as failed devices. Following completion of the binding phase, the FIM initiates calls, via a pre-boot application, to individual protocol functions of each operational device identified during the binding phase. If a first protocol call to a first operational device is successfully completed, the FIM identifies each protocol function corresponding to the first protocol call as an operational function. If a second protocol call fails, the FIM identifies each corresponding protocol function as a failed function(s) and isolates failed functions from operational functions for the first operational device.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of IHS 100/400 are not intended to be exhaustive, but rather are representative to highlight some of the components that are utilized to implement certain aspects of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including operating system (O/S) 108, Basic Input/Output System (BIOS)/unified extensible firmware interface (UEFI) 110, protocol stack 111, application(s) 114, and drivers 115. In addition, system memory 106 includes firmware, including but not limited to Fault Isolation Module (FIM) 112. In one or more embodiments, BIOS 110 is combined with additional functionality associated with (UEFI), and is thus illustrated as BIOS/UEFI 110 in these embodiments. The various software and/or firmware modules have varying functionality when their corresponding program code is executed by processor(s) 102 or other processing devices within IHS 100. During boot-up or booting operations of IHS 100, processor 105 selectively loads at least BIOS/UEFI driver or image from non-volatile random access memory (NVRAM) (not shown) to system memory 106 to be stored as BIOS/UEFI 110. In one or more embodiments, BIOS/UEFI image 110 comprises the additional functionality associated with unified extensible firmware interface and can include UEFI images and drivers.

IHS 100 further includes one or more input/output (I/O) controllers 120, which support connection to, and processing of, signals from one or more connected input device(s) 122, such as a keyboard, mouse, touch screen, or microphone. I/O controllers 120 also support connection to, and forwarding of, output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as $I^2C$, SMBus, and peripheral component interconnect (PCI) buses.

IHS 100 further comprises devices 116 and 118, which are electrically coupled to one or more components including processor 102. As illustrated, devices 116, 118 includes controllers 117, 119, respectively.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via network 136.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

With specific reference now to FIG. 2, there is depicted a high level server boot flow within an IHS, according to one embodiment. Boot flow 200 comprises multiple blocks representing different phases of a system boot. Boot flow 200 includes chipset/memory initialization block 202, driver dispatch block 204, driver connection block 206, and pre-boot application launch block 208. As illustrated in boot flow 200, a server boot-up process is initiated at chipset/memory initialization block 202 at which a corresponding chipset and/or memory initialization phase occurs. Upon completion of the chipset/memory initialization, the server boot up process moves to a driver dispatch phase as indicated by "Dispatch DXE drivers" block 204. At block 204, Driver Execution Environment (DXE) drivers are dispatched, where the dispatch operation includes loading of device drivers into memory and execution of initialization routines by the device drivers.

Driver connection block 206 represents a subsequent phase which is illustrated with a "Connect all UEFI Drivers" label. More particularly, driver connection block 206 represents the phase of BIOS Power-On Self Test (POST) where device drivers 115 bind to their respective controllers 117, 119. The BIOS POST phase is also referred to herein as the binding phase. Driver connection block 206 also represents a more common location for problematic drivers to hang. During this phase (i.e., the phase represented by 206), the BIOS can track if a driver successfully returns control back to the BIOS. If control is not successfully returned to the BIOS, the BIOS can disable the boot drive on a next boot.

Pre-boot application launch block 208 represents a later stage of the server boot-up process and is illustrated with an "Execute Pre-boot Applications" label. This label indicates that, at this stage, pre-boot applications, such as Collect System Inventory on Restart (CSIOR), System Software Manager (SSM) and Unified Server Configurator (USC), are executed. In one or more implementations, a Lifecycle Controller (LC) takes an inventory of the system. In addition, at this stage, calls are made into vendors' UEFI drivers. Also, at this stage, the LC can determine whether a driver successfully returns. If the driver does not successfully return, the LC can avoid this call, effectively disabling a corresponding feature at a next system boot.

During system boot-up, BIOS 110 loads all the images during the Driver Execution Environment (DXE) Power-On Self Test (POST) phase, which is followed by the binding process, as described in driver connection block 206. As described herein, the binding process is the central component that allows drivers 115 and controllers 117, 119 to be managed. The binding process provides (i) a service to test if a specific controller is supported by a driver, (ii) a service to start managing a controller, and (iii) a service to stop managing the controller. During the binding process on each device 116, 118, each device's slot information will be stored into persistent storage (e.g., storage 134), for example, a Complementary Metal-Oxide Semiconductor (CMOS), a Serial Peripheral Interface (SPI) flash area, or any storage device on service processor accessed through Keyboard Controller Style (KCS). On successful completion of the binding process for the target device, the persistent storage will be cleared, indicating there was no issue. If the system hangs due to a crash occurring while in the binding process, the persistent data will remain stored on the persistent storage.

On a next, subsequent boot, BIOS 110 will determine whether any driver 115 did not complete the binding process. If at least one driver did not complete the binding process, BIOS 110 will disable the slot with the device responsible for the system hang in the previous boot and conclude the corresponding binding process. After all devices 116, 118 have completed or concluded a respective binding process, the BIOS will launch the pre-boot application 114, as described in pre-boot application launch phase 208. IHS 100 can enter a bad state during pre-boot application execution as a result of the following: (a) a problematic issue with a pre-boot application accessing the device; (b) an issue/problem with an underlying functionality with the device. For example, these issues can include issues with the Firmware management protocol and/or the Human Interface Infrastructure (HII) Configuration access protocol. Pre-boot application 114 is used to detect a faulty device, whereby if the problematic issue is seen during execution of pre-boot application 114, BIOS 110 will not completely disable device functionality. Instead, Pre-boot application 114 will disable the specific functionality that caused the system hang or crash.

FIG. 3 illustrates a table providing information about an operational status of various functions provided by respective devices within an IHS, according to one embodiment. Table 300 comprises two rows of data including first data row 304 and second data row 306. In addition, table 300 comprises three columns including first column 308, second column 310 and third column 312. Also illustrated in table 300 is header/identifier row 302. As illustrated, first column 308 is labeled as "Slot Number" and identifies a slot number of a corresponding device. Second column 310 is labeled as "Unique ID" and provides a unique identification, such as a MAC address, for the corresponding device. Third column 312 is labeled as "Protocols failing GUID" and provides a textual representation of a globally unique identifier for a failing protocol.

In the specific example of table 300, as indicated via first data row 304, FIM 112 determines that pre-boot application 114 initiates a call to a device located in slot number 1 and having "xx:xx:xx:xx:xx:xx" as a unique ID. FIM 112 further determines that a call initiated by pre-boot application 114 to the firmware management protocol (FMP) was not successfully completed. For example, FIM 112 determines that the call to the FMP results in a system hang or crash and was not successfully completed. As a result, pre-boot application 114 disables the FMP protocol feature and avoids future calls to the device's FMP.

In second data row 306, example table 300 further indicates that FIM 112 determines that pre-boot application 114 initiates a call to a device (e.g., 116, 118) located in slot number 6 with "yy:yy:yy:yy:yy:yy" as a unique ID. FIM 112 further determines that a call initiated by pre-boot application 114 to the HII Forms Protocol was not successfully completed. For example, FIM 112 determines that the call to the HII Forms Protocol results in a system hang or crash. As a result, pre-boot application 114 disables the HII Forms protocol feature and avoids future calls to the device's HII Forms protocol.

As indicated by table 300, FIM 112 is able to selectively enable and disable respective functions within operational device (e.g., device 116). As a result, FIM 112 is able to tolerate function failures within a device and to maintain at least partial functionality with the device, rather than completely disabling or removing the device from IHS 100.

Thus, during a binding phase of a system boot, FIM 112 executing on processor 102 causes processor to initiate calls to detected electronic devices 116, 118. For simplicity, the various functional operations are described as being performed or triggered by FIM 112. It is however appreciated that these functional operations are performed and/or triggered by processor of IHS executing code segments of FIM 112 during system boot up. In response to a first call to a first detected device 116 being successfully completed, FIM 112 identifies the first detected device 116 as an operational device. In response to the first call to the first device or a second call to a second detected device 118 not being successfully completed, FIM 112 identifies the corresponding device (i.e., the first device if the first call is not completed or the second detected device if the second call is not completed) as a failed device. Following completion of the binding phase, FIM 112 initiates calls, via pre-boot application 114, to individual protocol functions of each operational device identified during the binding phase. In response to a first protocol call to a first operational device 116 being successfully completed, FIM 112 identifies protocol functions corresponding to the first protocol call as operational functions. In response to a second protocol call to the first operational device not being successfully completed, FIM 112 identifies protocol functions corresponding to the second protocol call as failed functions and isolates the failed functions from the operational functions for the first operational device 116.

FIM 112 initiates a binding process for each detected device, and stores slot information for each detected device in persistent storage during a respective binding process. In response to a binding process being successfully completed for a device, FIM 112 removes the stored slot information associated with the device. In response to determining or receiving indication that the binding process not being successfully completed, FIM 112 removes the stored slot information associated with the device, and disables the device. As a result, FIM 112 identifies the disabled device as a failed device.

According to one or more aspects, in response to identifying a device 116 as an operational device, FIM 112 initiates driver loading procedures via a controller 117 of the device 116 and performs a removal of stored slot information associated with device 116.

In order to determine whether a binding process is successfully completed, FIM 112 determines whether a reboot occurred during execution of the binding process. In response to determining that a system reboot occurred, FIM 112 determines whether stored slot information corresponding to a corresponding binding process exists. In response to determining that stored slot information corresponding to a respective binding process exists, FIM 112 prevents driver loading procedures for the device. In addition, FIM 112 identifies a device associated with the respective binding process as a failed device and provides notification of the failed device (to a user, in one embodiment).

In one or more aspects, FIM 112 isolates failed functions from the operational functions within the first operational device 116. The failed functions correspond to one of an identified protocol and an identified interface, as described in example table 300. FIM 112 identifies multiple different function failures via respective different protocol calls to first operational device 116. Furthermore, FIM 112 isolates from the operational functions within the first operational device the multiple failed functions that respectively correspond to multiple different protocols, as described in rows 304 and 306 of example table 300. In one or more implementations, as provided by example table 300, FIM 112 stores information that identifies failed functions within an operational device 116 by (a) a device slot number, (b) one or more of a unique address and a unique identification, and (c) a globally unique identifier (GUID).

According to one or more related aspects, FIM 112 initiates the binding process for device 116 during a first system boot. In response to the binding process being successfully completed, FIM 112 receives a first indication/notification of this successful completion of the binding process during the first system boot. In response to the binding process not being successfully completed, FIM 112 receives a second indication/notification that the binding process was not successfully completed during a subsequent second system boot. The second system boot is performed as a reboot that is initiated following a system hang and/or a system crash that occurred during the first system boot.

FIM 112 determines whether an automatic boot failure recovery mode, as opposed to a manual mode, is activated. In one or more embodiments, in an activated manual recovery mode, FIM 112 provides a user intervention functionality for selectively enabling and disabling sets of associated devices, to recover from multiple critical boot failures. For example, the user can disable a complete set of network cards or storage cards depending on the device responsible for the system hang/crash, based on a knowledge the user has of the faulty device.

In response to the automatic boot failure recovery mode being activated, FIM 112 performs a binding process for each respective device 116 without utilizing user input selection. In response to the automatic boot failure recovery mode not being activated, FIM 112 performs, utilizing user input selection in a manual mode, binding processes for respective devices when an associated stored slot entry exists indicating device failure.

Following activation of a manual mode of system boot failure recovery, FIM 112, in response to determining that stored slot information exists while the manual mode is activated, generates an output notification of failure information. FIM 112 also disables detectable devices by disabling device drivers that are expected to be loaded onto the detectable devices. Based on the detectable devices being disabled, FIM 112 enables user input selection capability. FIM 112 detects a user selection for deactivation of at least one of: (a) devices identified as failing devices; and (b) at least one operational device. FIM 112 then enables previously disabled device drivers associated with devices that the user has selected for activation. In one or more embodiments, FIM 112 enables the previously disabled device drivers during a next system boot. FIM 112 detects completion of the binding phase, and in response to detecting completion of the binding phase, initiates calls to functions of selected operational devices 116 using the pre-boot application 114.

Figure 4A:
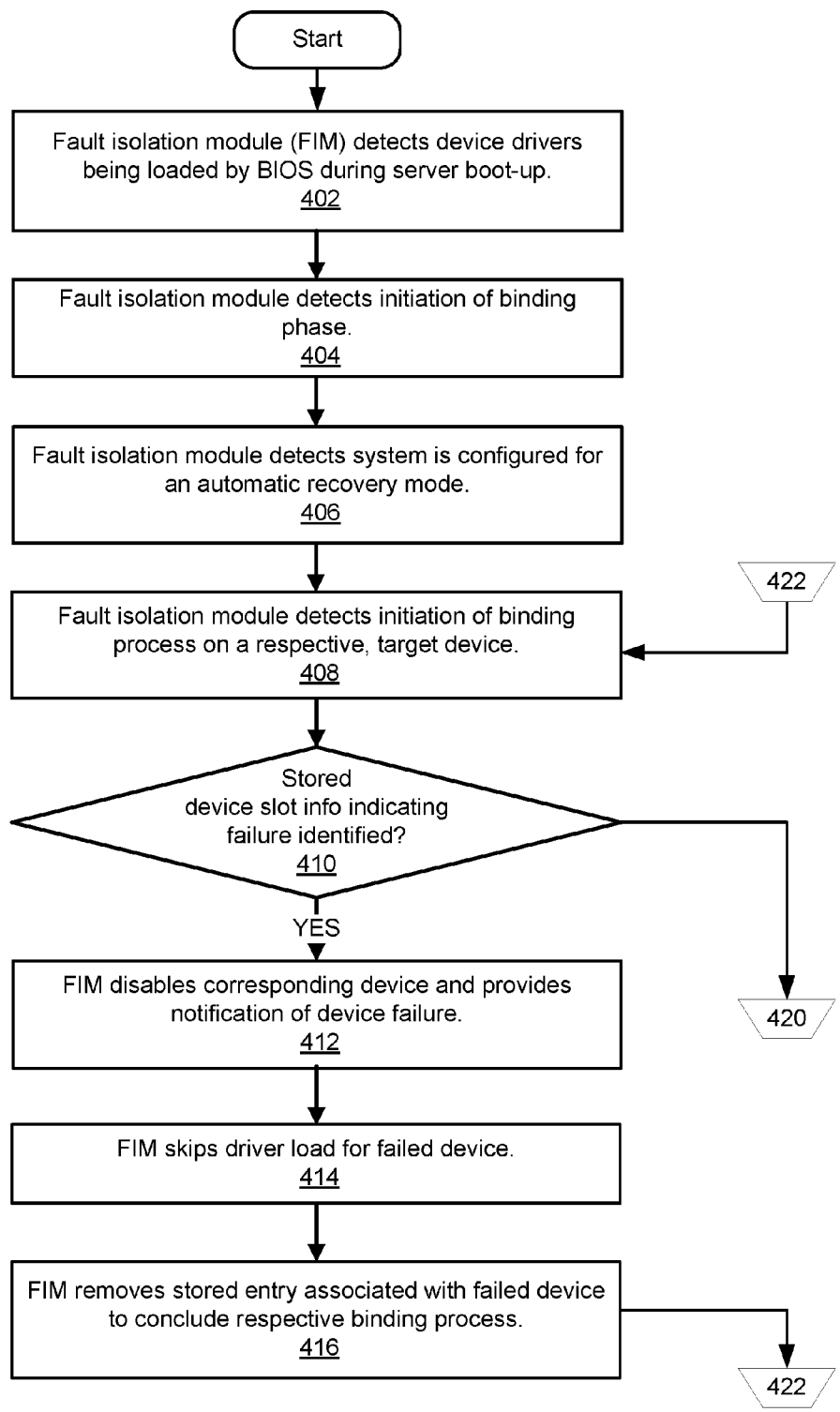
FIG. 4 (A-B) is a flow chart illustrating a method for performing server boot failure recovery when an automatic recovery mode is activated within an IHS, according to one embodiment.
Figure 4B:
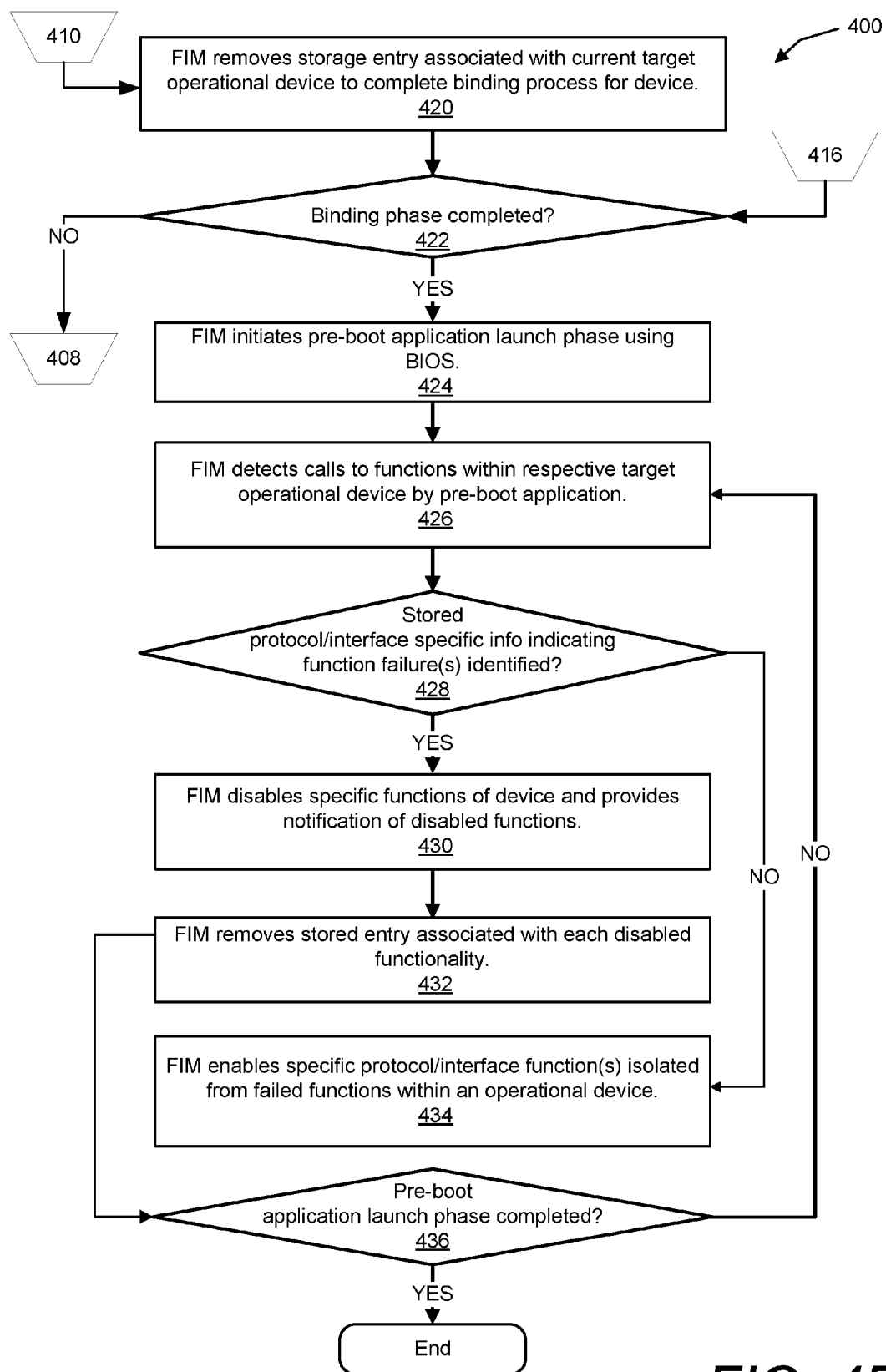
Figure 5:
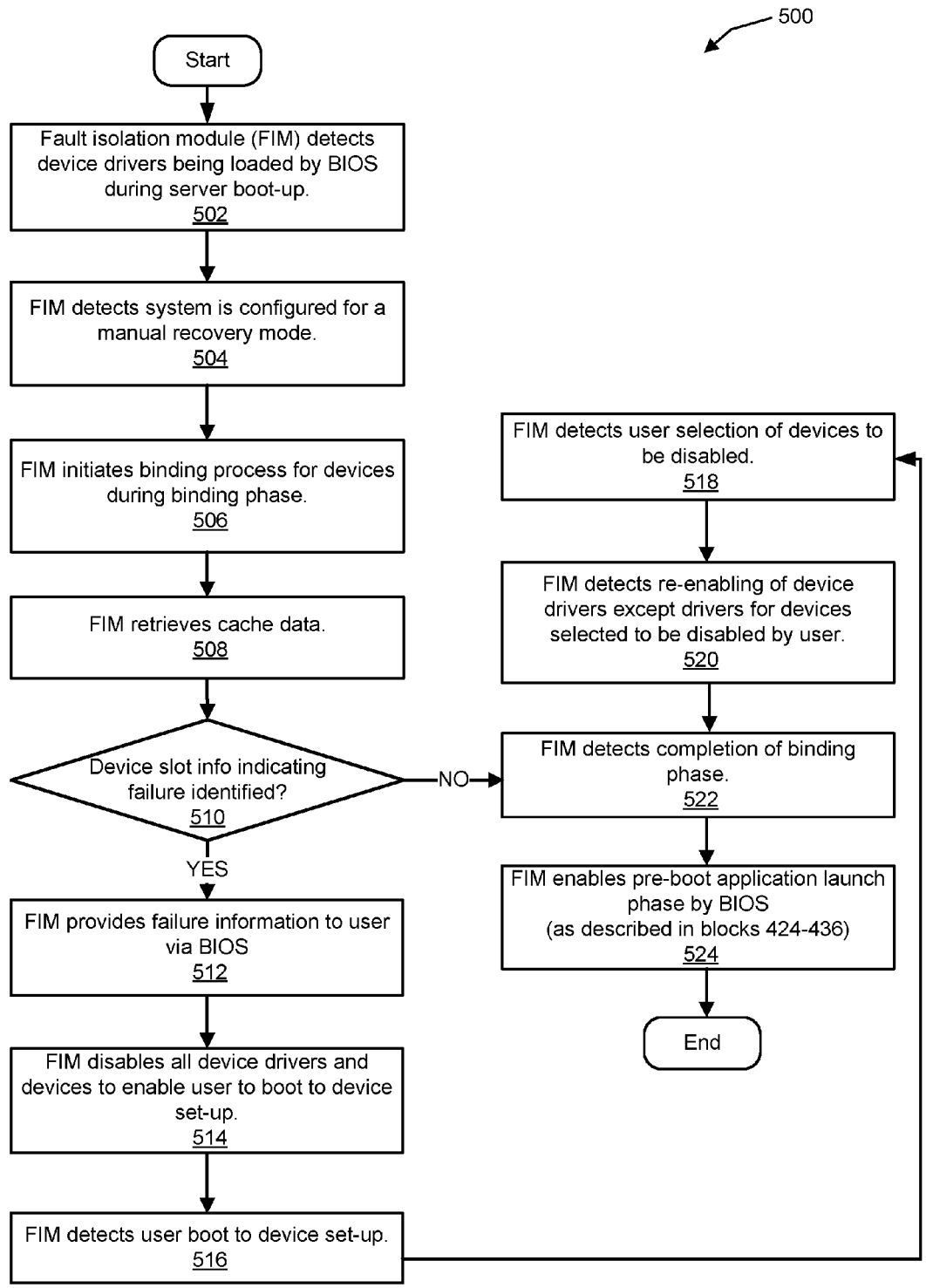
FIG. 5 is a flow chart illustrating a method for performing server boot failure recovery when a manual recovery mode is activated within an IHS, according to one embodiment.
Figure 6:
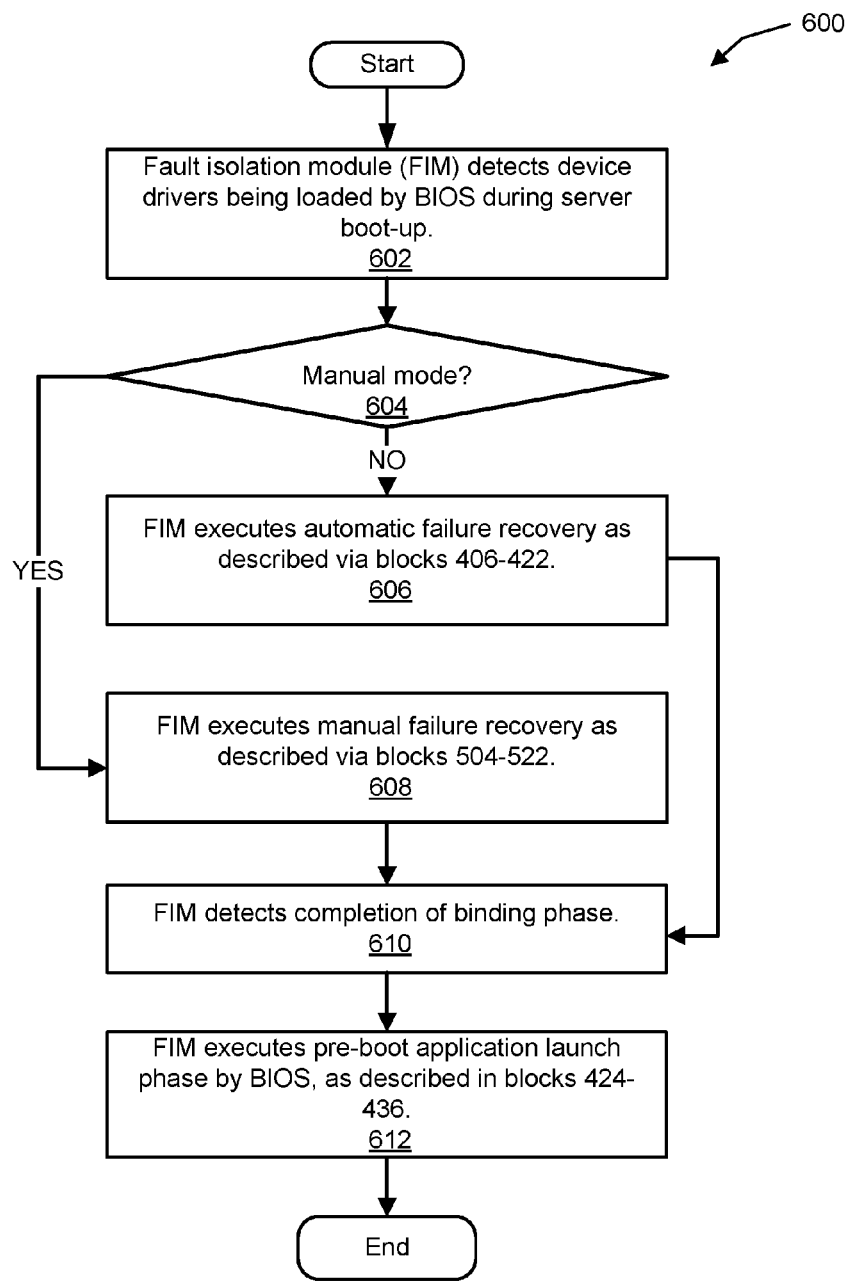
FIG. 6 is a flow chart illustrating a method for performing server boot failure recovery in an IHS that can be selectively configured in one of an automatic recovery mode and a manual recovery mode, according to one embodiment.

FIGS. 4-6 presents flowcharts illustrating example methods by which IHS 100 and specifically processor 102 executing functional code of FIM 112 presented within the preceding figures perform different aspects of the processes that enable one or more embodiments of the disclosure. Method 400 represents a method for performing server boot failure recovery when an automatic recovery mode is activated within IHS 100. Method 500 represents a method for performing server boot failure recovery when a manual recovery mode is activated within IHS 100. Method 600 represents a method for performing server boot failure recovery based on whether an automatic or a manual recovery mode is activated within IHS 100. The description of each method is provided with general reference to the specific components illustrated within the preceding figures. It is appreciated that certain aspects of the described methods may be implemented via other processing devices and/or execution of other code/firmware. In the discussion of FIGS. 4-6, reference is also made to elements described in FIGS. 1-3.

The method processes are performed by execution of FIM 112 by processor 102, and are generally described as functions performed by processor 102, for simplification of the description. With reference to FIG. 4A, method 400 begins at the start block and proceeds to block 402 at which processor 102 detects device drivers being loaded by BIOS during server boot-up. FIM 112 detects initiation of the binding phase (block 404). FIM 112 detects the system is configured for an automatic recovery mode (block 406). FIM 112 detects initiation of a binding process on a respective, target device (block 408). FIM 112 determines whether there is stored device slot information/entry that indicates a previous device failure exists or is identified (decision block 410). If FIM 112 determines that there is a device slot information/entry indicating a device failure exists or is identified, FIM 112 disables the corresponding device and provides notification of device failure (block 412). FIM 112 skips driver load for the failed device (block 414). FIM 112 removes the stored slot entry associated with the failed device to conclude the respective device's binding process (block 416) and proceeds to block 422 (FIG. 4B). However, if FIM 112 determines that there is no device slot information/entry indicating a device failure exists, the process proceeds to block 420 (FIG. 4B).

Turning to FIG. 4B, FIM 112 removes the stored slot entry associated with current target operational device to complete the binding process for the respective device (block 420). FIM 112 determines whether the binding phase is completed and, in particular, whether binding processes involving detectable devices were all concluded (decision block 422). If FIM 112 determines that the binding phase is not completed, the process returns to block 408, at which a binding process is initiated on a next detected device. If FIM 112 determines that the binding phase is completed, FIM 112 initiates a pre-boot application launch phase using the BIOS (block 424).

During pre-boot processing, FIM 112 detects calls to functions within a respective target operational device by pre-boot application (block 426). FIM 112 determines whether there is/are any protocol/interface specific information indicating that there is/are function failure(s) (block 428). If FIM 112 determines that there is/are protocol/interface specific information indicating function failure(s), FIM 112 disables specific functions of device and provides notification of disabled functions (block 430). FIM 112 removes a stored entry associated with a respective disabled functionality (block 432) and proceeds to block 436. However, if at block 428, FIM 112 determines that there is/are no protocol/interface specific information (which is associated with the call) indicating function failure(s), FIM 112 enables specific protocol/interface function(s), which are isolated from failed functions which may be detected within an operational device (block 434). FIM 112 determines whether the pre-boot application launch phase is completed (decision block 436). If the pre-boot application launch phase is not completed, the process returns to block 426, and, if the pre-boot application launch phase is completed, the process concludes at the end block.

According to one or more related aspects, FIM 112 initiates the pre-boot processing for a device during a first system boot instance. In response to the pre-boot processing being successfully completed, FIM 112 receives a first indication/notification of this successful completion of the pre-boot processing during the first system boot instance. In response to the pre-boot processing not being successfully completed, FIM 112 receives a second indication/notification that the pre-boot processing was not successfully completed during a subsequent second system boot instance. The second system boot instance is performed as a reboot that is initiated following a system hang and/or a system crash that occurred during the first system boot instance.

Method 500 begins at the start block and proceeds to block 502 at which processor 102 (executing fault isolation module (FIM) 112) detects device drivers being loaded by the BIOS during server boot-up. FIM 112 detects or receives an indication that IHS 100 is configured for a manual recovery mode (block 504). FIM 112 successively initiates binding processes for devices during the binding phase (block 506). FIM 112 retrieves cache/persistent storage information (block 508). FIM 112 determines whether there is/are any stored device slot information indicating a failure exists or was identified (decision block 510). If FIM 112 determines that there is stored device slot information indicating that a failure exists, FIM 112 provides failure information (to the user) via the BIOS (block 512). The stored slot information indicates, at a current boot period, that a failure occurred and/or exists as a result of a system hang or crash during a previous boot period. FIM 112 disables all device drivers and devices to enable the user to boot to a device set-up interface (block 514). FIM 112 detects a user booting to a device set-up interface (block 516). FIM 112 detects user selection of devices to be disabled via the device set-up interface (block 518). FIM 112 detects re-enabling of device drivers for enabling corresponding devices, except drivers for devices selected to be disabled by user (block 520). FIM 112 detects completion of binding phase (block 522). FIM 112 enables pre-boot application launch phase by BIOS, as described in blocks 424-436 (block 524). The process concludes at the end block.

Method 600 begins at the start block and proceeds to block 602 at which fault isolation module (FIM) 112 detects device drivers being loaded by BIOS during server boot-up. FIM 112 determines whether a manual failure recovery mode is activated (decision block 604). If FIM 112 determines that the manual failure recovery mode is not activated, FIM 112 executes the automatic failure recovery (block 606), as described via blocks 406-422, and proceeds to block 610. If FIM 112 determines that the manual failure recovery mode is activated, FIM 112 executes the manual failure recovery (block 608), as described via blocks 504-522. FIM 112 detects completion of binding phase (block 610). FIM 112 executes pre-boot application launch phase by BIOS (block 612), as described in blocks 424-436. The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   a processor;
   a memory system communicatively coupled to the processor via a system bus and having at least one device driver installed thereon;
   at least one electronic device communicatively coupled to the processor, the at least one electronic device having a corresponding device driver from among the at least one device driver;
   a fault isolation module (FIM) executing on the processor and which configures the processor to:
   initiate calls to detected electronic devices during a binding phase of a system boot;
   in response to a first call to a first detected device being successfully completed, identify the first detected device as an operational device;
   in response to a second call to a second detected device not being successfully completed, identify the second detected device as a failed device;
   initiate calls, via a pre-boot application, to individual protocol functions of each operational device identified during the binding phase;
   in response to a first protocol call to a first operational device being successfully completed, identify protocol functions corresponding to the first protocol call as operational functions; and
   in response to a second protocol call to the first operational device not being successfully completed, identify protocol functions corresponding to the second protocol call as failed functions and isolate the failed functions from the operational functions for the first operational device.

2. The IHS of claim 1, wherein the processor:
   initiates a binding process for each detected device;
   stores slot information for each detected device during a respective binding process;
   in response to a binding process being successfully completed for a device, removes the stored slot information associated with the device;
   in response to the binding process not being successfully completed:
   removes the stored slot information associated with the device; and
   disables the device, wherein a disabled device is identified as a failed device.

3. The IHS of claim 2, wherein the processor:
   in response to identifying a device as an operational device, performs a removal of stored slot information associated with the device.

4. The IHS of claim 1, wherein in determining whether a binding process is successfully completed, the processor:
   determines whether a reboot occurred during execution of the binding process;
   in response to determining that a system reboot occurred determines whether stored slot information corresponding to a corresponding binding process exists;
   in response to determining that stored slot information corresponding to a respective binding process exists:
   prevents driver loading procedures with the device;
   identifies a device associated with the respective binding process as a failed device; and
   provides notification of the failed device to a user.

5. The IHS of claim 1, wherein the processor:
   isolates from the operational functions within the first operational device failed functions which correspond to one of an identified protocol and an identified interface.

6. The IHS of claim 1, wherein the processor:
   identifies multiple different function failures via respective different protocol calls to the first operational device; and
   isolates from the operational functions within the first operational device the multiple failed functions which correspond to multiple different protocols.

7. The IHS of claim 1, wherein the processor:
   initiates said binding process for a device during a first system boot;
   in response to said binding process being successfully completed, receives a first indication that said binding process is successfully completed during said first system boot;
   in response to said binding process not being successfully completed, receives a second indication that said binding process was not successfully completed during a subsequent second system boot performed as a reboot following one of a system hang and a system crash that occurred during the first system boot.

8. The IHS of claim 1, wherein the FIM:
   determines whether an automatic boot failure recovery mode, as opposed to a manual mode, is activated;

in response to the automatic boot failure recovery mode, as opposed to a manual mode, being activated, performs a binding process for each respective device without utilizing user input selection; and in response to the automatic boot failure recovery mode, as opposed to a manual mode, being activated, performs, utilizing user input selection, binding processes for respective devices when an associated stored slot entry exists indicating device failure.

9. The IHS of claim 8, wherein the FIM:
detects activation of a manual mode of a system boot failure recovery;
in response to determining that stored slot information exists while the manual mode is activated:
generates an output notification of failure information;
disables detectable devices by disabling device drivers that are expected to be loaded onto the detectable devices;
enables user input selection capability based on the detectable devices being disabled;
detects a selection for deactivation of at least one of: (a) devices identified as failing devices; and (b) at least one operational device;
enables previously disabled device drivers associated with devices that are selected for activation, wherein the previously disabled device drivers are enabled during a next system boot;
detects completion of the binding phase;
in response to detecting completion of the binding phase, initiates said calls to said functions of selected operational devices using said pre-boot application.

10. The IHS of claim 1, wherein the FIM:
provides via the manual recovery mode a user intervention functionality for selectively enabling and disabling sets of associated devices, to recover from multiple critical boot failures.

11. The IHS of claim 1, wherein the FIM:
stores information that identifies failed functions within an operational device by (a) a device slot number, (b) one or more of a unique address and a unique identification, and (c) a globally unique identifier (GUID).

12. A method performed in an information handling system (IHS), the method comprising:
initiating calls to detected electronic devices during a binding phase of a system boot;
in response to a first call to a first detected device being successfully completed, identifying the first detected device as an operational device;
in response to a second call to a second detected device not being successfully completed, identifying the second detected device as a failed device;
initiating calls, via a pre-boot application, to individual protocol functions of each operational device identified during the binding phase;
in response to a first protocol call to a first operational device being successfully completed, identifying protocol functions corresponding to the first protocol call as operational functions; and
in response to a second protocol call to the first operational device not being successfully completed, identifying protocol functions corresponding to the second protocol call as failed functions and isolating the failed functions from the operational functions for the first operational device.

13. The method of claim 12, further comprising:
initiating a binding process for each detected device;
storing slot information for each detected device during a respective binding process;
in response to a binding process being successfully completed for a device, removing the stored slot information associated with the device; and
in response to the binding process not being successfully completed:
removing the stored slot information associated with the device; and
disabling the device, wherein a disabled device is identified as a failed device.

14. The method of claim 13, further comprising:
in response to identifying a device as an operational device, performing a removal of stored slot information associated with the device.

15. The method of claim 12, wherein said determining whether a binding process is successfully completed further comprises:
determining whether a reboot occurred during execution of the binding process;
in response to determining that a system reboot occurred determining whether stored slot information corresponding to a corresponding binding process exists;
in response to determining that stored slot information corresponding to a respective binding process exists:
preventing driver loading procedures with the device;
identifying a device associated with the respective binding process as a failed device; and
providing notification of the failed device to a user.

16. The method of claim 12, further comprising:
storing information that identifies failed functions within an operational device by (a) a device slot number, (b) one or more of a unique address and a unique identification, and (c) a globally unique identifier (GUID); and
isolating from the operational functions within the first operational device failed functions which correspond to one of an identified protocol and an identified interface.

17. The method of claim 12, further comprising:
identifying multiple different function failures via respective different protocol calls to the first operational device; and
isolating from the operational functions within the first operational device the multiple failed functions which correspond to multiple different protocols.

18. The method of claim 12, further comprising:
initiating said binding process for a device during a first system boot;
in response to said binding process being successfully completed, receiving a first indication that said binding process is successfully completed during said first system boot;
in response to said binding process not being successfully completed, receiving a second indication that said binding process was not successfully completed during a subsequent second system boot performed as a reboot following one of a system hang and a system crash that occurred during the first system boot.

19. The method of claim 12, further comprising:
determining whether an automatic boot failure recovery mode, as opposed to a manual mode, is activated;
in response to the automatic boot failure recovery mode, as opposed to a manual mode, being activated, performing a binding process for each respective device without utilizing user input selection; and in response to the automatic boot failure recovery mode, as opposed to a manual mode, being activated, performing, utilizing user input selection, binding processes for respective devices when an associated stored slot entry exists indicating device failure.

20. The method of claim 19, further comprising:

detecting activation of a manual mode of a system boot failure recovery; and in response to determining that stored slot information exists while the manual mode is activated:

generating an output notification of failure information;

disabling detectable devices by disabling device drivers that are expected to be loaded onto the detectable devices;

enabling user input selection capability based on the detectable devices being disabled;

detecting a selection for deactivation of at least one of: (a) devices identified as failing devices; and (b) at least one operational device;

enabling previously disabled device drivers associated with devices that are selected for activation, wherein the previously disabled device drivers are enabled during a next system boot;

detecting completion of the binding phase; and in response to detecting completion of the binding phase, initiating said calls to said functions of selected operational devices using said pre-boot application;

wherein a user intervention functionality for selectively enabling and disabling sets of associated devices, to recover from multiple critical boot failures is provided via the manual mode.

* * * * *